United States Patent [19]
Arnold

[11] Patent Number: 5,676,049
[45] Date of Patent: Oct. 14, 1997

[54] APPARATUS FOR BARBECUE GRILLING OF FOOD

[75] Inventor: John Frank Arnold, Cupar, United Kingdom

[73] Assignee: Flavorsavor Limited, United Kingdom

[21] Appl. No.: 632,592

[22] Filed: Apr. 15, 1996

[30] Foreign Application Priority Data

Apr. 13, 1995 [GB] United Kingdom ............... 9507778

[51] Int. Cl.$^6$ ............................................... A47J 37/08
[52] U.S. Cl. .................... 99/401; 99/447; 99/451; 126/21 A; 126/39 J; 126/41 R
[58] Field of Search ............... 99/401, 447, 451; 126/21 A, 39 H, 39 J, 41 R

[56] References Cited

U.S. PATENT DOCUMENTS

| | | | |
|---|---|---|---|
| 4,094,297 | 6/1978 | Ballentine | 126/39 J |
| 4,788,962 | 12/1988 | Mashburn et al. | 126/25 |
| 4,823,684 | 4/1989 | Traeger et al. | 99/447 |
| 4,951,646 | 8/1990 | Diekmann et al. | 126/39 J |

FOREIGN PATENT DOCUMENTS

| | | |
|---|---|---|
| 0302685 | 2/1989 | European Pat. Off. |
| 2219391 | 6/1988 | United Kingdom . |
| 2265079 | 2/1993 | United Kingdom . |
| 82/03544 | 10/1982 | WIPO . |

*Primary Examiner*—Reginald Alexander
*Attorney, Agent, or Firm*—Beveridge, DeGrandi, Weilacher & Young, L.L.P.

[57] ABSTRACT

The present invention relates to an apparatus for barbecue grilling of food comprising an outer housing (1) having a grill (2) upon which food can be placed, a radiant heat source (3) located below the grill (2), and a supply (4) of combustible gas and air mixture to heat the radiant heat source (3). The radiant heat source (3) comprises a chamber located within the outer housing, the inner chamber (3) being spaced from the outer housing (1) to define an air passage (9) and wherein a supply of pressurized air flows in the air passage (9), the pressurized air providing a primary source of air for mixing with the combustible gas and a secondary source of air which passes into the inner chamber (3) thereby increasing oxidizing conditions within the inner chamber.

11 Claims, 1 Drawing Sheet

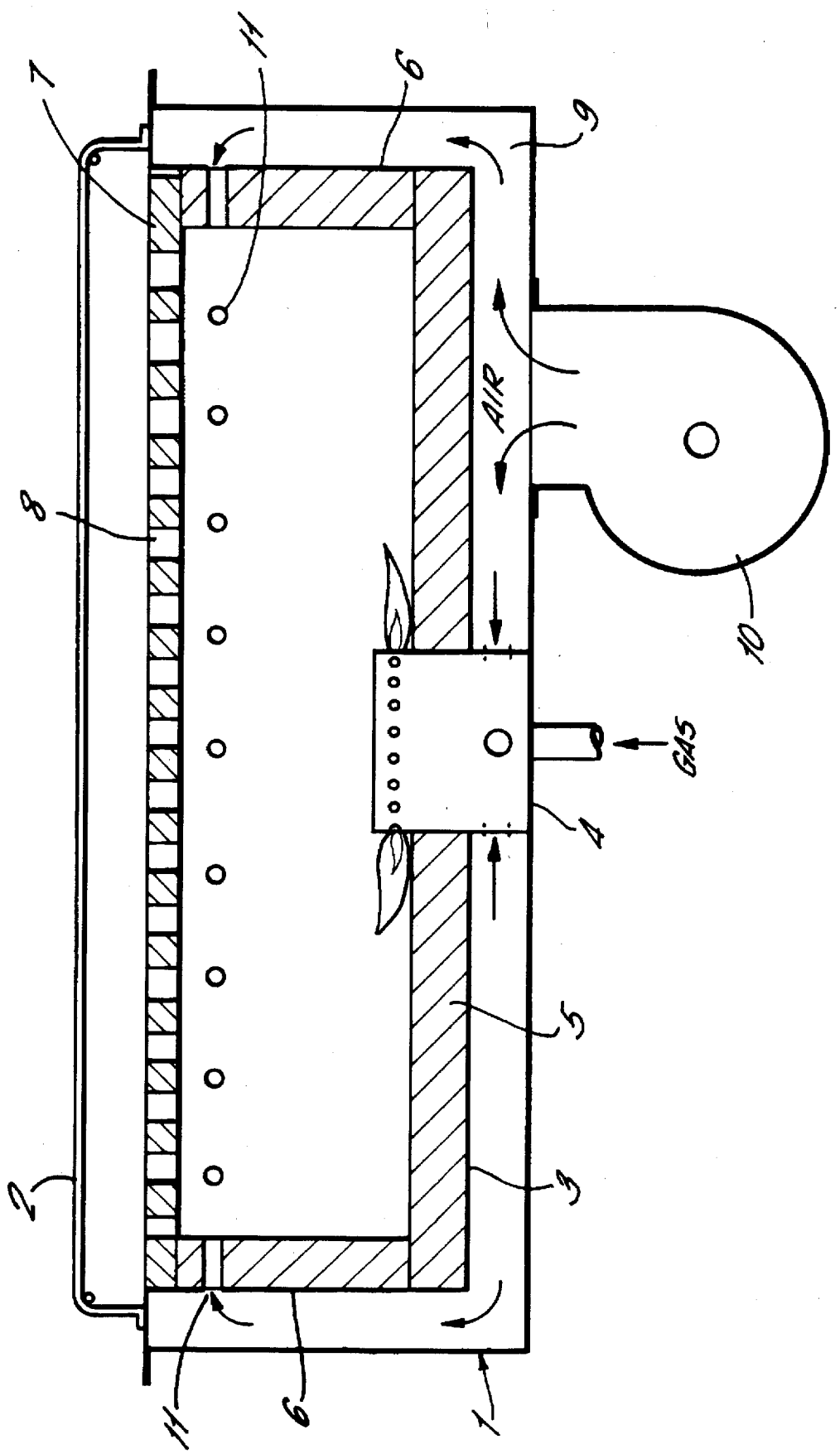

APPARATUS FOR BARBECUE GRILLING OF FOOD

BACKGROUND OF THE INVENTION

The present invention relates to an apparatus for barbecue grilling of food.

Barbecue grilling is normally carried out by placing food to be cooked over a radiant heat source. The radiant heat source will typically be a fuel bed of combusting charcoal or a wood material. Recently, barbecue grills have been introduced which utilize a bed of inert material heated directly or indirectly by a gas or electric heater.

A typical gas heated grill will be fired by a Bunsen type burner. The burner will utilize some of the air passing through it as primary air but the remaining air will act as secondary combustion air, to allow complete combustion of the gas. The secondary combustion air is made available around the flame, both above and below the bed of inert material.

During barbecue grilling of foods, fat or oil from the food such as sausage, meat, chicken or marinated food, will melt as the temperature of the food is raised by the radiated heat from above or below. The fat or oil will then drop or splash on to the radiant heat source. Upon contact with the radiant heat source, the fat or oil will vaporise at a rate dependent upon the temperature of the surface of the radiant heat source. In some cases, the fat or oil will eventually ignite with a lazy yellow flame due to insufficient air to immediately oxidize the fat. This will cause carbon to be deposited on the food. Thus, there exists the disadvantage that the food can be tainted by carbon deposits. Furthermore, a large uncontrolled fat fuelled flame can prove to be a significant fire hazard.

Clearly, there is a demand for a means of barbecue grilling which completely combusts falling fat or oil from cooking foods to avoid smokey flames and associated carbon deposits.

SUMMARY OF THE INVENTION

Accordingly, the present invention provides an apparatus for barbecue grilling of food comprising an outer housing having a grill upon which food can be placed, a radiant heat source located below the grill, and a supply of combustible gas and air mixture to heat the radiant heat source wherein the radiant heat source comprises a chamber located within the outer housing, the inner chamber being spaced from the outer housing to define an air passage and wherein a supply of pressurized air flows in the air passage, the pressurized air providing a primary source of air for mixing with the combustible gas and a secondary source of air which passes into the inner chamber thereby increasing oxidizing conditions within the inner chamber.

Preferably, the radiant heat source comprises a chamber having a base and side walls of insulating material and a metal top with apertures.

Preferably, the pressurized air passes into the inner chamber via one or more ports located below the metal top of the inner chamber and above the flame from the supply of combustible gas and air mixture.

Preferably, the combustible gas and air mixture is provided by a gas burner which is arranged such that the flame impinges on the base of the inner chamber.

Preferably, the percentage of air to gas in the gas burner exceeds 60% of stoichiometric.

Preferably, the apertures in the metal top of the inner chamber provide an open area such that the gas burner supplies 100 to 200 Btu per hour for each cm$^2$ of open area.

DESCRIPTION OF THE PREFERRED EMBODIMENTS

A preferred embodiment of the present invention will now be described, by way of example only, with reference to the accompanying drawing.

FIG. 1 depicts a section through an apparatus according to the present invention. The apparatus comprises an outer housing 1 having a grill or rack 2 on which food can be placed. A radiant heat source 3 is located below the grill 2 and a supply 4 of combustible gas and air mixture is provided to heat the radiant heat source 3. The radiant heat source 3 comprises a chamber located within the outer housing 1 having a base 5 and side walls 6 of insulating material and a metal top or register 7 with apertures 8. The inner chamber 3 is spaced from the outer housing 1 defining an air passage 9. A fan 10 supplies pressurized air to the air passage 9.

The pressurized air provides a primary source of air for mixing with the combustible gas in supply 4 and a secondary source of air which passes along air passage 9 and through ports 11 in the side walls 6 into the inner chamber 3. The ports 11 are located just below the metal top 7 and above the plane of the flame from the supply 4 thus ensuring complete combustion of the gas and other combustible materials. The supply 4 is typically a gas burner or burners arranged such that the flame impinges on the inner surface of the base 5.

For the best results the percentage of air to gas in the mixture of the burner 4 exceeds 60% of stoichiometric.

With this apparatus the air flowing in air passage 9 is preheated by the hot surfaces of the inner chamber 3 thereby increasing fuel efficiency.

The apertures 8 in the metal top 7 provide an open slotted area which allows:

1. Sufficient containment of gases within the inner chamber to provide mixing;
2. Sufficient ventilation to allow complete combustion of both the gas and falling food products; and
3. Sufficient radiation from the inner surfaces of the inner chamber to radiate upwards onto food on the grill.

Preferably, the gas burner 4 supplies 100 to 200 Btu per hour for each cm$^2$ of open area provided by apertures 8.

British Priority Application 9507778.0 filed on 13 Apr. 1995 is relied on and incorporated by reference in its entirety.

I claim:

1. An apparatus for grilling food, comprising:
   an outer housing;
   a grill upon which food can be placed supported by the outer housing;
   a radiant heat source located below the grill;
   means for producing a supply of pressurized air; and
   a supply of combustible gas and air mixture to heat the radiant heat source,
   wherein the radiant heat source defines an inner chamber located within the outer housing, the inner chamber having a base, insulating side walls and a metal top having a plurality of apertures defined therein, the radiant heat source being spaced from the outer housing to define an air passage, and
   wherein the supply of pressurized air flows in the air passage, the pressurized air providing a primary source of air for the combustible gas and air mixture, and the pressurized air providing a secondary source of air which passes into the inner chamber to increase oxidizing conditions within the inner chamber.

2. An apparatus as claimed in claim 1, wherein the pressurised air passes into the inner chamber via one or more ports located below the metal top of the inner chamber and above the flame from the supply of combustible gas and air mixture.

3. An apparatus as claimed in claim 1, wherein the combustible gas and air mixture is provided by a gas burner which is arranged such that the flame impinges on the base of the inner chamber.

4. An apparatus as claimed in claim 1, wherein the percentage of air to gas in the gas burner exceeds 60% of stoichiometric.

5. An apparatus as claimed in claim 1, wherein the apertures in the metal top of the inner chamber provide an open area such that the gas burner supplies 100 to 200 Btu per hour for each $cm^2$ of open area.

6. An apparatus as claimed in claim 2, wherein the combustible gas and air mixture is provided by a gas burner which is arranged such that the flame impinges on the base of the inner chamber.

7. An apparatus as claimed in claim 2, wherein the percentage of air to gas in the gas burner exceeds 60% of stoichiometric.

8. An apparatus as claimed in claim 3, wherein the percentage of air to gas in the gas burner exceeds 60% of stoichiometric.

9. An apparatus as claimed in claim 2, wherein the apertures in the metal top of the inner chamber provide an open area such that the gas burner supplies 100 to 200 Btu per hour for each $cm^2$ of open area.

10. An apparatus as claimed in claim 3, wherein the apertures in the metal top of the inner chamber provide an open area such that the gas burner supplies 100 to 200 Btu per hour for each $cm^2$ of open area.

11. An apparatus as claimed in claim 4, wherein the apertures in the metal top of the inner chamber provide an open area such that the gas burner supplies 100 to 200 Btu per hour for each $cm^2$ of open area.

* * * * *